Aug. 31, 1965   J. H. SPENCER, JR., ETAL   3,204,084
ELECTRICAL DEICER
Filed May 7, 1963   2 Sheets-Sheet 1

INVENTOR.
JESSIE H. SPENCER, JR.
DEAN T. BOWDEN
BY
ATTORNEY

AGENT

Aug. 31, 1965  J. H. SPENCER, JR., ETAL  3,204,084
ELECTRICAL DEICER
Filed May 7, 1963  2 Sheets-Sheet 2

INVENTOR.
JESSIE H. SPENCER, JR.
DEAN T. BOWDEN
BY
ATTORNEY
AGENT

3,204,084
ELECTRICAL DEICER
Jessie H. Spencer, Jr., El Cajon, and Dean T. Bowden, San Diego, Calif., assignors to General Dynamics Corporation, San Diego, Calif., a corporation of Delaware
Filed May 7, 1963, Ser. No. 278,659
3 Claims. (Cl. 219—202)

This invention relates to electrical deicing or heating apparatus, and more particularly, to apparatus for heating or deicing aircraft structures.

Various means have been proposed for removing ice from the surfaces of aircraft upon which it tends to form, such as the leading edge portions of supporting or control surfaces, air intakes, etc., upon which air tends to impinge during flight. Some of these prior means have involved the use of bulky, heavy and complicated hot air ducting systems, others made use of a deicing liquid of which only a limited quantity could be carried without increasing the weight of the aircraft to a degree which could not be tolerated, while others in the form of inflatable "boots" produced changes in the contour of the surfaces to which they were applied.

High subsonic and supersonic speed aircraft are provided with highly developed aerodynamic contours for the parts of the aircraft upon which air impinges, particularly for the main supporting planes and control surfaces. Engine air intakes, particularly of jet engines, are aerodynamically designed to provide the proper amount of air at the required pressure at the design speed. Ramps or spikes may be employed in supersonic jet engine inlets to properly position the shock wave with respect to the inlet lip.

While the weight of ice accumulations are undesirable, far more important are the changes in aerodynamic contours caused by accumulation of ice. The higher the speed of the aircraft, the greater becomes the importance of maintaining the correct aerodynamic contours.

It is, therefore, an object of the present invention to provide electrically heated means for removing ice from aerodynamic surfaces.

Another object of this invention is to provide electrically heated deicing apparatus requiring a relatively small amount of electrical power.

Another object of this invention is to provide an electrically deicer suitable for use on aerodynamic surfaces having compound curves.

Another object of this invention is to provide electrical deicing apparatus which is reliable, light in weight, conforms to compound surfaces, efficient, and simple and inexpensive to build.

Figure 1:
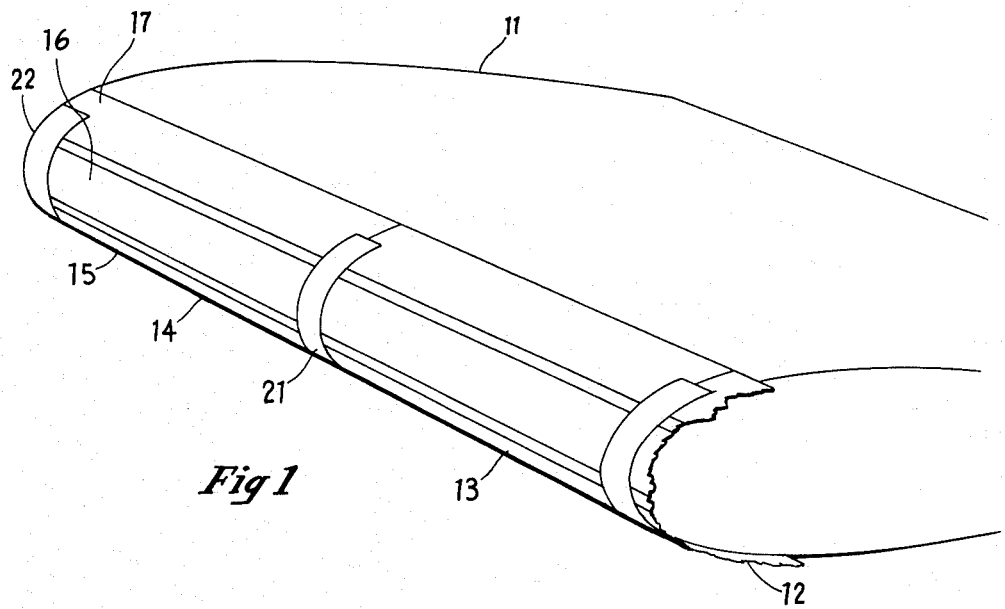
Figure 2:
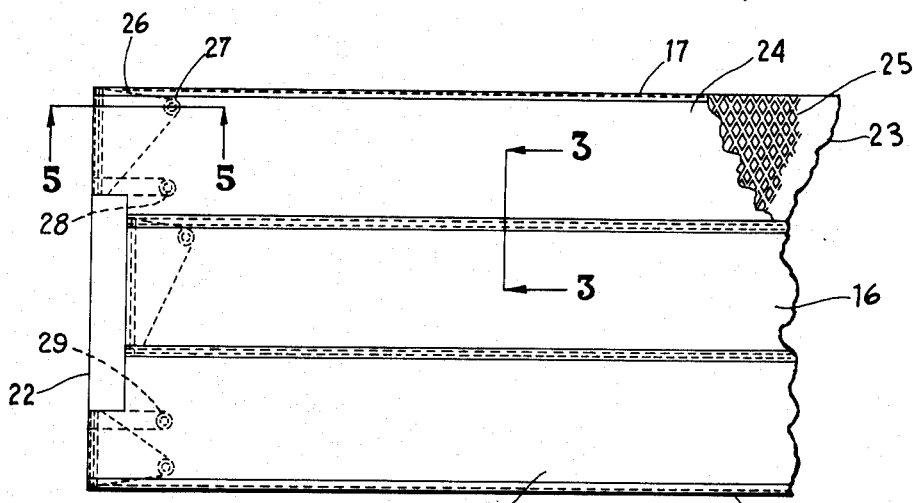
Figure 3:
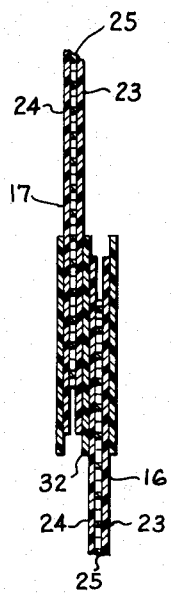
Figure 4:
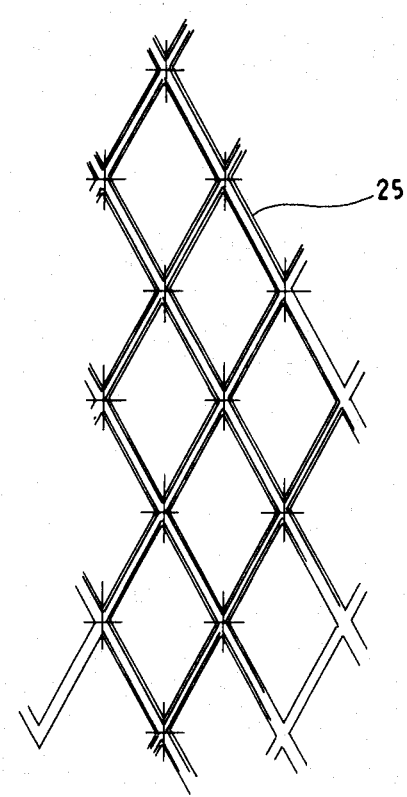
Figure 5:
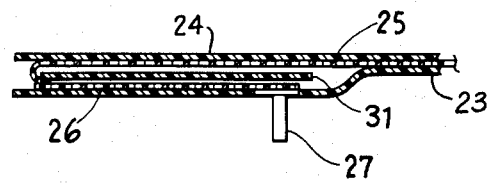

These and other objects and advantages of the present invention will become apparent from the following specification and appended drawings, wherein:

FIGURE 1 illustrates the deicing apparatus of the present invention on an aerodynamic surface, FIGURE 2 illustrates the deicing element of FIGURE 1 flattened out, FIGURE 3 is an enlarged fragmentary sectional view taken as indicated by line 3—3 in FIGURE 2, FIGURE 4 illustrates the heating elements employed in the present invention, and FIGURE 5 is an enlarged fragmentary sectional view taken as indicated by line 5—5 in FIGURE 2.

Exemplary of aerodynamic surfaces to be deiced is the leading edge of wing 11, a portion of which is illustrated by FIGURE 1. The deicer 12 of the present invention comprises expanded metal heating elements embedded in a fiberglass reinforced plastic laminated structure contoured to the aerodynamic shape of the wing. A plurality of heating panels, exemplarily panels 13 and 14, are distributed along the leading edge of wing 11. Each panel, exemplarily panel 14, is formed of a number of elongated sections, such as sections 15, 16 and 17 illustrated in FIGURES 1 and 2. Parting strips 21 and 22, having a function to be disclosed hereinbelow, are provided on each end of each panel, as at the ends of panel 14.

Each section, exemplarily, section 16, is fabricated of fiberglass reinforced epoxy plastic outer protective sections 23 and 24, and inner expanded metal heating element 25. Heating element 25 is fabricated of a suitable resistive alloy having high oxidation and corrosion resistance. The nickel alloy known to the art as Inconel, having the composition disclosed in "Mechanical Engineers' Handbook," fifth edition, edited by Lionel S. Marks, McGraw-Hill, 1951, in Table 15, page 612, is presently preferred. Epoxy resin in the open areas of the expanded metal bonds the two outer layers 23 and 24 to one another and to the expanded metal element 25. In a typical embodiment, element 25 is 3¾ inches wide and has a resistivity of 1¼ ohms per foot.

Since the period of time during which power is applied to each heating element is short, it is necessary that the current distribution, and resulting heat distribution, be uniform. If heat distribution through the element is not uniform, ice will cling to relatively cold spots and relatively hot spots will cause water to run back to form ice on unheated areas. In order to equalize current distribution and the resultant heat distribution, low resistance buses are provided at each end of each heater element. Exemplarily, bus 26 is inserted between terminal 27 and heating element 25. Buses are preferably fabricated of the same expanded metal material as heating element 25, but having a larger cross-section to provide the low resistance required to provide a unipotential uniform current distribution across the entire width of element 25. As illustrated in FIGURE 5, the edge of heating element 25 is folded over a plastic impregnated fiberglass separator 31. Bus 26 is welded to the folded over edge of heater element 25, and terminal 27 is welded to bus 26. Separator 31 serves to insulate the bus from the heater element except at the desired place of contact. This structure enables the heater element to extend to the edge of the section.

Parting strips, such as parting strip 22, are narrow strips at the ends of panels such as 14 each fabricated substantially similarly to section 16 and having an expanded metal heating element (not shown) substantially similar to element 25, which are continuously heated under icing conditions by current continuously applied through terminals 28 and 29, preventing formation of ice thereupon. Thus, it will be apparent that sheets of ice form upon the aircraft, separated from one another by the narrow parting strips. When the panels are energized, the layer of ice bonded to the skin is melted, and the ice is blown off by the airstream in sheets defined by the parting strips.

Referring now to FIGURES 2 and 3, each section, as 17, is fabricated of a glass fiber reinforced plastic sheet such as 24 molded to the contour of the aerodynamic surface, such as 11. The heating elements such as 25 are applied to their respective sheets curving to conform thereto. A suitable resin is applied to the heater element and to the glass fiber sheet 24, and a cover glass fiber sheet 23 is applied, conforming to the curved surface. Section 16 is similarly fabricated, and bonded to section 17 by a resin impregnated glass fiber sheet 32. Section 15 is similarly fabricated and bonded to section 16, forming a unitary panel covering a portion of the aerodynamic surface, as the leading edge of wing 11.

Since many variations of the hereinabove disclosed embodiment of the invention will be apparent to those skilled in the art, the invention is to be given its broadest possible interpretation within the terms of the following claims.

What we claim is:

1. Electrical aircraft deicing apparatus comprising:
 a plurality of elongated heating panels on an aerodynamic surface, said panels including
 a first layer of electrical insulating material fastened to said aerodynamic surface,
 a second layer of electrical insulating material overlying said first layer,
 a cyclically energized resistance heating element between said first and second layers of electrical insulating material,
 a continuously energized expanded metal parting strip at the end of each of said panels, said parting strips being of a substantially smaller size than said elongated heating panels, and
 means enabling uniform distribution of electrical energy to said heating element and to said parting strip.

2. Electrical aircraft deicing apparatus comprising:
 a plurality of elongated heating panels on an aerodynamic surface, each of said panels including
 a first layer of reinforced plastic electrical insulating material fastened to said aerodynamic surface,
 a second layer of reinforced plastic electrical insulating material overlying said first layer,
 a cyclically energized expanded metal resistance heating element bonded between said first and second layers of electrical insulating material,
 a pair of high conductance expanded metal buses, each connected to one end of asid resistance element,
 a continuously energized expanded metal parting strip at the end of each of said panels, and
 terminals enabling distribution of electrical energy to said heating element and said parting strip.

3. Electrical aircraft deicing apparatus comprising:
 a plurality of elongated heating panels on an aerodynamic surface, each of said panels including
 a first layer of reinforced plastic electrical insulating material fastened to said aerodynamic surface,
 a second layer of reinforced plastic electrical insulating material overlying said first layer,
 a cyclically energized expanded Inconel resistance heating element bonded to said first and second layers of electrical insulating material through the interstices of said expanded Inconel,
 a pair of high conductance expanded metal buses each welded to one end of said resistance element,
 a continuously energized expanded Inconel parting strip at the end of each of said panels, and
 terminals connected to said buses and said parting strip enabling distribution of electrical energy to said heating element and said parting strip.

References Cited by the Examiner

UNITED STATES PATENTS

| | | | |
|---|---|---|---|
| 2,129,046 | 9/38 | Clay | 219—553 X |
| 2,543,970 | 3/51 | Horsfall et al. | 338—254 X |
| 2,627,012 | 1/53 | Kinsella et al. | 244—134 |
| 2,741,692 | 4/56 | Luke | 219—528 |
| 2,743,890 | 5/56 | La Rue | 219—202 X |
| 2,757,273 | 7/56 | Taylor | 219—549 X |
| 2,762,897 | 9/56 | Vrooman et al. | 219—202 X |
| 2,938,992 | 5/60 | Crump | 219—528 |
| 2,992,317 | 7/61 | Hoffman | 219—202 |

FOREIGN PATENTS 740,551  11/55  Great Britain.

RICHARD M. WOOD, *Primary Examiner.*